United States Patent [19]
Duncan

[11] Patent Number: 5,370,720
[45] Date of Patent: Dec. 6, 1994

[54] FLUE GAS CONDITIONING SYSTEM

[75] Inventor: Kent S. Duncan, Martinsville, Ind.

[73] Assignee: Welhelm Environmental Technologies, Inc., Indianapolis, Ind.

[21] Appl. No.: 96,368

[22] Filed: Jul. 23, 1993

[51] Int. Cl.$^5$ .............................................. B01D 51/10
[52] U.S. Cl. ................................... 55/222; 55/257.1; 55/259; 96/27; 96/53
[58] Field of Search .................. 95/58, 60, 62, 64–66, 95/71, 72; 96/27, 52, 53; 55/222, 257.1, 257.7, 259

[56] References Cited

U.S. PATENT DOCUMENTS

| | | | |
|---|---|---|---|
| 1,441,713 | 1/1923 | Prosser . | |
| 1,909,825 | 5/1933 | Hahn et al. . | |
| 2,382,253 | 8/1945 | Penney et al. | 95/66 |
| 2,602,734 | 7/1952 | Hedberg et al. | 75/1 |
| 2,706,533 | 4/1955 | Hedberg et al. | 95/60 X |
| 2,864,456 | 12/1958 | Hall et al. | 96/53 X |
| 3,284,990 | 11/1966 | Orne | 55/5 |
| 3,300,282 | 1/1967 | Risk et al. . | |
| 3,363,398 | 1/1968 | Wheatcroft | 55/5 |
| 3,424,560 | 1/1969 | Carmassi et al. . | |
| 3,473,298 | 10/1969 | Berman | 55/222 |
| 3,477,203 | 11/1969 | Luge et al. | 55/9 |
| 3,523,407 | 8/1970 | Humbert | 55/106 |
| 3,568,403 | 3/1971 | Richardson | 55/5 |
| 3,581,463 | 6/1971 | Roberts | 55/4 |
| 3,607,034 | 9/1971 | Henry et al. . | |
| 3,613,333 | 10/1971 | Gardenier | 55/89 |
| 3,665,676 | 5/1972 | McKewen | 96/52 X |
| 3,686,825 | 8/1972 | Busby | 55/5 |
| 3,689,213 | 9/1972 | Guerrieri | 55/5 |
| 3,704,569 | 12/1972 | Hardison et al. | 55/4 |
| 3,704,570 | 12/1972 | Gardenier | 55/84 |
| 3,719,471 | 3/1973 | Jones | 75/65 |
| 3,722,178 | 3/1973 | Aaland et al. | 55/4 |
| 3,818,682 | 6/1974 | Farrow et al. | 55/106 |
| 3,893,828 | 7/1975 | Archer | 55/104 |
| 3,899,308 | 8/1975 | Petersson | 95/72 X |
| 3,907,510 | 9/1925 | Collins | 55/233 X |
| 3,966,436 | 6/1976 | Archer | 55/147 |
| 3,993,429 | 12/1976 | Archer | 55/5 X |
| 4,029,752 | 6/1977 | Cahn | 423/563 |
| 4,035,165 | 7/1977 | Archer | 55/13 |
| 4,042,348 | 8/1977 | Bennett et al. | 55/5 |
| 4,058,372 | 11/1977 | DeLaMater | 55/5 |
| 4,060,589 | 11/1977 | Hass et al. | 423/244 |
| 4,070,424 | 1/1978 | Olson et al. | 95/60 X |
| 4,121,541 | 10/1978 | Kneissl et al. | 55/85 X |
| 4,184,886 | 1/1980 | Ellingen et al. | 95/66 X |
| 4,190,875 | 2/1980 | Smart et al. | 96/27 X |
| 4,205,630 | 6/1980 | Regan | 122/1 R |
| 4,208,192 | 6/1980 | Quigley et al. | 55/5 |
| 4,223,640 | 9/1980 | Rochford et al. | 122/1 R |
| 4,284,417 | 8/1981 | Reese et al. | 55/2 |
| 4,305,909 | 12/1981 | Willett et al. | 55/222 X |
| 4,333,746 | 6/1982 | Southam | 55/5 X |
| 4,352,747 | 10/1982 | Every et al. | 55/5 X |
| 4,390,831 | 6/1983 | Byrd et al. | 55/105 X |
| 4,466,815 | 8/1984 | Southam | 55/122 |
| 4,533,364 | 8/1985 | Altman et al. | 55/5 |

(List continued on next page.)

FOREIGN PATENT DOCUMENTS

| | | | |
|---|---|---|---|
| 888086 | 12/1971 | Canada . | |
| 1178025 | 11/1984 | Canada . | |
| 82200153.3 | 10/1982 | European Pat. Off. . | |
| 2809199 | 9/1979 | Germany . | |
| 3108709.4 | 9/1982 | Germany . | |
| 3109847.9 | 9/1982 | Germany . | |
| 0601854 | 11/1986 | U.S.S.R. | 95/71 |

*Primary Examiner*—Robert Spitzer
*Attorney, Agent, or Firm*—Ice Miller Donadio & Ryan

[57] ABSTRACT

A flue gas conditioning system uses the waste heat of the flue gas to heat a conditioning agent such as water to add sufficient heat energy to the water to generate steam that can be used to atomize the water into a very fine mist with droplets less than 50 microns injected into the flue gas. The fine mist evaporates quickly conditioning the flue gas to enhance particulate removal by a precipitator or filter. Also, humidification of the flue gas causes trace heavy metals—arsenic, mercury, selium, copper, zinc, etc.—to condense on fly ash particles. Such metals are targeted for removal by the EPA under the blanket description "air toxics."

20 Claims, 3 Drawing Sheets

U.S. PATENT DOCUMENTS

| | | | |
|---|---|---|---|
| 4,548,789 | 10/1985 | Ballestra | 422/160 |
| 4,574,062 | 3/1986 | Weitman | 261/147 |
| 4,613,346 | 9/1986 | Reyes et al. | 55/4 |
| 4,624,685 | 11/1986 | Lueckenotte et al. | 55/13 |
| 4,659,342 | 4/1987 | Lind | 55/2 |
| 4,678,481 | 7/1987 | Diep | 55/4 |
| 4,705,101 | 11/1987 | Warner | 165/104.31 |
| 4,735,636 | 4/1988 | Roberts | 55/80 |
| 4,756,893 | 7/1988 | Lin | 423/244 |
| 4,770,674 | 9/1988 | Tellini et al. | 55/5 |
| 4,779,207 | 10/1988 | Woracek et al. | 364/500 |
| 4,793,270 | 12/1988 | Karaset et al. | 110/344 |
| 4,799,941 | 1/1989 | Westermark | 55/90 |
| 4,843,980 | 7/1989 | Markham et al. | 110/342 |
| 4,844,723 | 7/1989 | Tellini et al. | 55/106 |
| 4,931,265 | 6/1990 | Leussler | 423/244 |
| 4,960,445 | 10/1990 | Helfritch | 55/5 |
| 4,966,610 | 10/1990 | Krigmont et al. | 55/5 |
| 4,975,264 | 12/1990 | Franken | 423/522 |
| 4,987,839 | 1/1991 | Krigmont et al. | 110/216 |
| 4,999,167 | 3/1991 | Skelley et al. | 55/222 X |
| 5,008,628 | 4/1991 | Krigmont et al. | 324/693 |
| 5,011,516 | 4/1991 | Altman et al. | 55/5 |
| 5,024,171 | 6/1991 | Krigmont et al. | 110/345 |
| 5,024,681 | 6/1991 | Chang | 55/6 |
| 5,029,535 | 7/1991 | Krigmont et al. | 110/345 |
| 5,030,428 | 7/1991 | Dorr et al. | 423/215.5 |
| 5,032,154 | 7/1991 | Wright | 55/106 |
| 5,061,467 | 10/1991 | Johnson et al. | 423/242 |
| 5,074,226 | 12/1991 | Lynch | 110/345 |
| 5,084,258 | 1/1992 | Lin | 423/244 |
| 5,122,162 | 6/1992 | Krigmont et al. | 55/5 |
| 5,122,353 | 6/1992 | Valentine | 423/244 |
| 5,196,038 | 3/1993 | Wright | 55/5 |
| 5,217,508 | 6/1993 | Jonsson | 55/89 |
| 5,240,470 | 8/1993 | Wright | 95/58 |
| 5,261,931 | 11/1993 | Wright | 95/3 |

FLUE GAS CONDITIONING SYSTEM

FIELD OF THE INVENTION

This invention relates to a system for treating boiler flue gas to improve the removal of particulate matter contained therein by electrostatic and other means, and more particularly, to a flue gas conditioning system that utilizes highly atomized water as the conditioning agent for the particulate matter prior to passage through an electrostatic precipitator or filter.

BACKGROUND OF THE INVENTION

The increasing demand for electrical power has forced electrical utilities to burn increasing quantities of fossil fuels such as coal and oil. However, electric utilities also face increasing environmental standards imposed upon their operations by state and federal regulatory agencies that mandate reduced particulate and acid generating smoke stack emissions. To reduce acid generating emissions, electrical utilities have turned to burning low-sulfur coal in their boilers to generate the steam necessary for electric power generation. To reduce the particulate emissions, electric utilities generally use a flue gas treatment system to remove a majority of the particulate matter in the gas effluent passing out of the smoke stack. Such flue gas treatment systems typically comprise an electrostatic device such as an electrostatic precipitator or a fabric filter baghouse to remove the particulate. Such devices also typically provide a source of conditioning agent to the flue gas to enhance the effectiveness of the precipitator or filter in removing the particulate.

The efficiency of an electrostatic precipitator in removing particulate matter from the boiler flue gas is partially dependent upon the electrical resistivity of the entrained particulate matter in the boiler flue gas. The entrained particulate matter expelled from a boiler fired with low-sulfur coal, i.e., coal having less than 1 percent sulfur, has been found to have a resistivity of approximately $10^{13}$ ohm/cm. It has been determined that the most efficient removal of particulate matter by electrostatic precipitation occurs when the particulate matter resistivity is approximately $10^8$ ohms/cm. Therefore, to obtain more effective use of an electrostatic precipitator, the resistivity of the entrained particulate matter from low-sulfur content coal must be reduced. Electrical utilities have long used conditioning agents introduced into the flue gas flow upstream of the electrostatic precipitator to reduce the resistivity of the entrained particles. Various chemicals, such as water, hydrous ammonia, sulfuric acid, sulfur trioxide, phosphoric acid and various ammonia-bearing solutions have been used as conditioning agents.

Similarly, the operating pressure of a fabric filter baghouse will decrease with the addition of humidity to the flue gas which increases ash cohesivity and dust cake porosity. Thus, the pressure drop across the baghouse is reduced by the introduction of humidity to the flue gas.

Water has been recognized for over thirty years as a primary potential conditioning agent for electrostatic precipitators. For example, U.S. Pat. No. 2,864,456 discloses varying the amount of conditioning agent such as water and varying the voltage of the electrostatic precipitator to maintain the optimum sparking level for particulate removal. In addition, U.S. Pat. No. 3,665,676 discloses that mixtures of water and ammonia or ammonium salts such as ammonium sulfate and ammonium bisulfate are effective as flue gas conditioning agents.

However, while several commercial attempts have been made to utilized the simple concept of water injection to increase the efficiency of flue gas precipitators, most commercial scale attempts have not been satisfactory for technological reasons. To be effective as a conditioning agent, water or water mixture must be atomized to a very fine mist that can be evaporated by the resident heat in the flue gas in a very short distance from its introduction. Water droplets that do not evaporate can mix with the ash particulate in the flue gas forming a "mud" or "sludge" that collects on any mechanical component in its path. After a very short time, the water will be evaporated from the coating, leaving a very hard, cement like coating on the component. Over time, the coating can increase to the point where it obstructs the flow path of the flue gas or reduces the operational performance of the precipitator by reducing the critical electrical clearances. Prior art systems were ineffective because economic and technological solutions did not exist to produce sufficiently atomized water to avoid the "sludge" problem.

In order to atomize the water or water mixture sufficiently to a droplet size that will evaporate rapidly enough to avoid formation of sludge coatings, it has been found that the water droplets must be 50 microns or less. A significant amount of energy is required to be applied to the atomization system to overcome the cohesive attraction of individual water molecules to reduce the droplet size to below 50 microns. Droplet size is inversely proportional to the amount of energy introduced into the system.

While there have been significant advances in nozzle technology that allow the production of water droplets smaller than 50 microns, large atomizing air compressors or steam generating units are required to produce the energy necessary to force the water through such nozzles with sufficient velocity to produce extremely fine droplets. Consequently, while the art has developed to the point where it is technologically feasible to produce water mist with droplets less than 50 microns, the energy required makes such a system economically undesirable as a flue gas conditioning system for electrical utilities.

Thus, it would be a substantial advance in the art to have a system for treating boiler flue gas to improve the removal of particulate matter that utilizes highly atomizer water or water mixtures as a conditioning agent that is effective and economically acceptable. Accordingly, a system for treating boiler flue gas to improve the removal of particulate matter that utilizes highly atomized water that taps available energy sources within the system to increase the energy level of the water to facilitate atomization in an effective and economically feasible manner would overcome the deficiencies in the prior art.

BRIEF SUMMARY OF THE INVENTION

A system for treating boiler flue gas to improve the removal of particulate matter in accordance with the present invention is used in a boiler system having a flue gas conduit for conveying heated flue gas from the fuel burning chamber of the boiler to a particulate removing device such as a precipitator or fabric filter baghouse. A source of liquid conditioning agent is provided. A heat exchanger means for transferring sufficient heat from the flue gas to the liquid conditioning agent to exceed the heat of vaporization of the conditioning agent is provided. The heat exchanger means has an inlet and an outlet, and a pump means is connected between the source of conditioning agent and the inlet of the heat exchanger means for conveying the conditioning agent to the heat exchanger means under sufficient pressure so as to maintain the heated conditioning agent in a liquid state within the heat exchanger means. A throttle means is connected to the outlet of the heat exchange means for rapidly reducing the pressure of the heated conditioning agent passing through the throttle means by an amount sufficient to cause the conditioning agent to vaporize. An atomization means is provided for combining predetermined quantities of the conditioning agent from the source of conditioning agent with a sufficient amount of the vaporized conditioning agent from the throttle means to cause the conditioning agent to be atomized into droplets of less than 50 microns. An injection means is connected to the atomizing means for introducing the atomized conditioning agent into the flue gas conduit before the precipitator. Thus, highly atomizer conditioning agent is introduced into the flue gas prior to the precipitator thereby reducing the resistivity of the particulate matter in the flue gas and enhancing the effectiveness of the precipitator.

Typically, in the preferred embodiment, the conditioning agent is water. However, the conditioning agent may also be ammonia (anhydrous or aqueous), or a mixture of water and ammonia, proprietary chemicals, surfactants, activated charcoal, or an ammonium salt such as ammonium sulfate and ammonium bisulfate.

Also in the preferred embodiment the heat exchanger means comprises a plurality of heat exchanger units positioned within the flue gas conduit and connected to one another in series. Such a series connection of heat exchanger units allows more efficient progressive heating of the conditioning agent through a series of smaller heat exchangers.

The system may further comprise a control valve means connected between the atomizer and the pump for conveying predetermined, controllable quantities of conditioning agent from the pump to the atomization means. The control valve allows the amount of conditioning agent being introduced into the atomization means to be variably controlled to maximize the atomization and reduce the particle size to the greatest extent possible.

In an alternative embodiment, the system may further comprise an auxiliary heat means connected between the heat exchange means and the throttle means for introducing additional heat to the conditioning agent. Thus, if the heat available in the flue gas is insufficient for adequate atomization, additional heat may be supplied to permit reduction of the water droplet size to less than 50 microns. Typically, such an auxiliary heat means is an electric heater or a heating unit that uses fossil fuel combustion as the source of heat.

In another alternative embodiment, the system may include an air compressor means connected to the atomization means for increasing the pressure within the atomization means to facilitate the atomization of the conditioning agent. Thus, if the amount of energy introduced by the heat exchanger means is inadequate to adequately atomize the conditioning agent, additional energy to further atomize the conditioning agent can be supplied economically by a small auxiliary air compressor.

Accordingly, it is a primary object of the present invention to provide a system for treating boiler flue gas to improve the removal of particulate matter that utilizes highly atomized conditioning agent such as water or mixtures of water and other agents as a conditioning agent to reduce the resistivity of the particulate in the flue gas that is effective and economically acceptable.

It is yet another object of the present invention to provide a system for treating boiler flue gas to improve the removal of particulate matter that utilizes highly atomized water or water mixtures as a conditioning agent that makes use of waste heat of the system as an energy source to assist in the atomization process.

These and other objects, advantages and features of the present invention shall hereinafter appear, and for the purposes of illustration but not for limitation, exemplary embodiments of the present invention shall hereinafter be described.

DETAILED DESCRIPTION OF THE PREFERRED EMBODIMENTS

Figure 1:
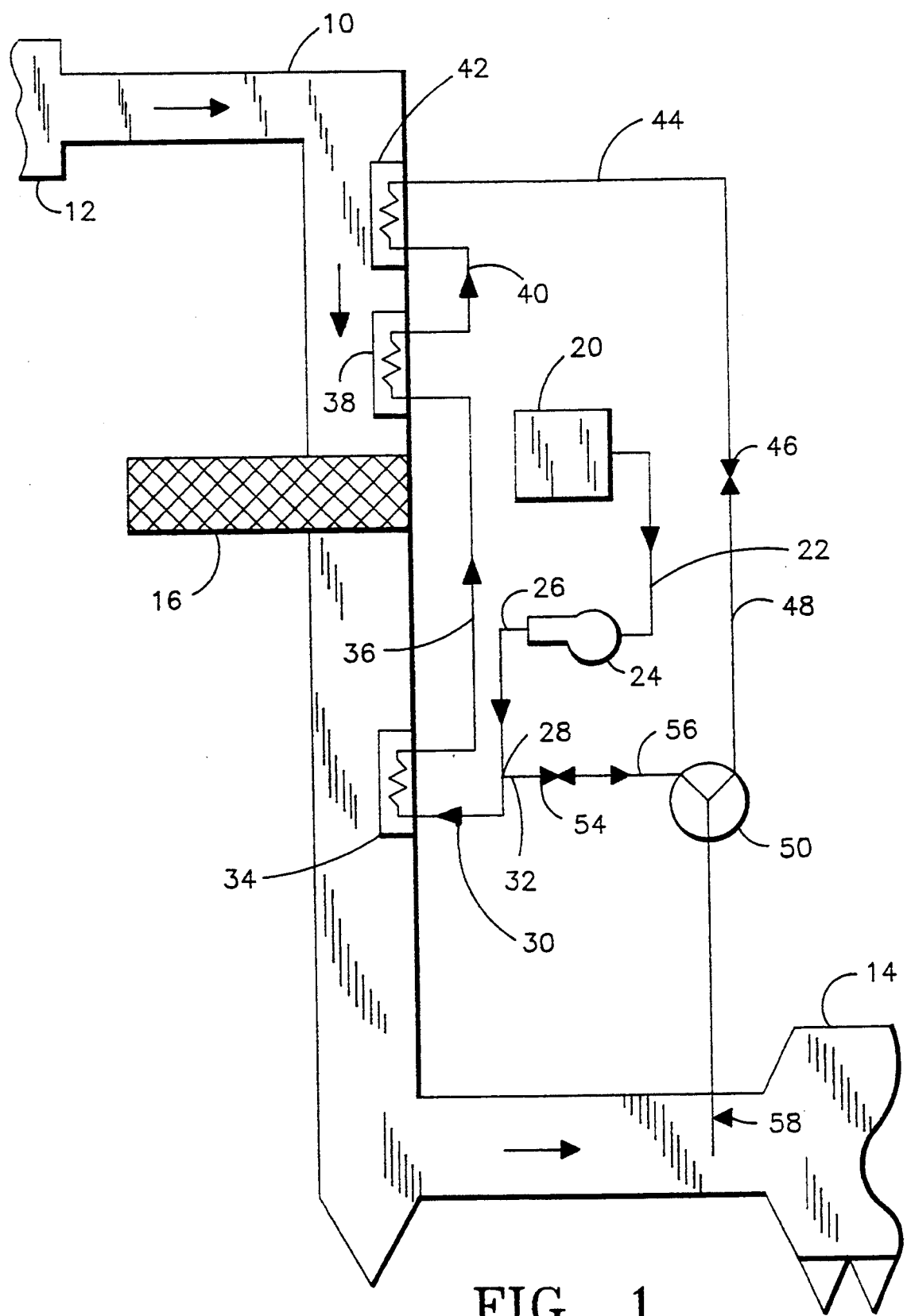
FIG. 1 is a block diagram of the various components of the present invention.

With reference to FIG. 1, a preferred embodiment of the present invention is illustrated. A conventional boiler system in which the present invention may be used comprises a flue gas conduit 10 connected between the fuel combustion chamber of a boiler 12 and a conventional electrostatic precipitator 14 used to remove particulate from the flue gas. It should be recognized that while the present embodiment is shown in use with an electrostatic precipitator 14, the present invention could also be advantageously used in a system using a fabric filter baghouse to remove particulate from the flue gas as well.

Flue gas exits the combustion chamber of boiler 12 at approximately 750 to 850 degrees fahrenheit. A conventional air preheater 16 is provided to transfer heat from the hot flue gas in conduit 10 to the air being introduced into the combustion chamber of boiler 12 in a conventional manner. A fan (not shown) conventionally forces air through the air preheater 16 and into the combustion chamber to provide oxygen for combustion and pressure to force the flue gas through the conduit 10.

The present invention comprises a supply of liquid conditioning agent 20. The liquid conditioning agent may be plain tap water, in which case supply 20 is taken direct from the water main. However, conditioned or deionized water may be used if the local tap water is unsuitable, in which case, source 20 is a conventional water conditioning or deionizing unit.

Source 20 is connected by appropriate hollow piping 22 to the intake of a pump 24 so that the conditioning agent can be pumped from source 20 by the pump 24. The conditioning agent exits the output of pump 24 under pressure and is conveyed by hollow piping 26 to a T joint 28 which divides the conditioning agent output of pump 24 between hollow piping 30 and 32. Piping 30 is connected to the input of a first exchanger 34 positioned in the stream of hot flue gas within conduit 10. A portion of the liquid conditioning agent from pump 20 is conveyed through piping 30 to the first exchanger 34 which transfers heat from the flue gas in conduit 10 to the liquid conditioning agent.

The output of first heat exchanger 34 is connected by hollow piping 36 to the input of a second heat exchanger 38 also positioned in the stream of hot flue gas but ahead of heat exchanger 34 and air preheater 16. Second heat exchanger 38 transfers additional heat from the flue gas to the liquid conditioning agent in the heat exchanger 38. The output of second heat exchanger 38 is connected by appropriate hollow piping 40 to the input of a third heat exchanger 42 positioning in the stream of hot flue gas in conduit 10 ahead of second heat exchanger 38. Third heat exchanger 42 transfers additional heat from the hot flue gas to the liquid conditioning agent in heat exchanger 42. The outlet of heat exchanger 42 is connected by hollow piping 44 to a throttle valve 46. The liquid conditioning agent leaving third heat exchanger 42 is superheated to about 300 to 500 degrees fahrenheit above the heat of vaporization of the conditioning agent, but sufficient pressure is maintained by pump 24 (approximately 200 p.s.i.) to prevent the liquid conditioning agent from vaporizing as it exits third heat exchanger 42.

Throttle valve 46 is a pressure relief means for rapidly reducing the pressure on the super heated liquid conditioning agent to cause it to vaporize into super heated steam as it passes through the throttle valve 46. The output of throttle valve 46 is connected by hollow piping 48 to the inlet of an atomization chamber 50 so that the vaporized conditioning agent is conveyed into the atomization chamber.

A portion of the liquid conditioning agent from pump 24 is conveyed through piping 32 to the inlet of a control valve 54. The outlet of control valve 54 is connected by hollow piping 56 to another inlet of atomization chamber 50. Control valve 54 allows a predetermined, controllable amount of liquid conditioning agent to be introduced into atomization chamber 50 to be combined with the superheated vaporized conditioning agent produced by throttle valve 46. The combined conditioning agent is then passed through nozzle assemble 58 that is connected to the outlet of atomization chamber 50. Nozzle assembly 58 is positioned in the stream of flue gas in conduit 10 immediately before the precipitator 14 so that the conditioning agent is injected into the flue gas in a very fine mist to be rapidly evaporated before entering the precipitator.

While a single atomization chamber 50 is shown in this embodiment, it should be recognized that atomization may also be accomplished in a multiplicity of small atomization chambers positioned immediately adjacent each of the individual injector nozzles of the nozzle assembly.

The vaporized conditioning agent has sufficient heat energy added by the heat exchangers 34, 38 and 42 that when combined with the liquid conditioning agent introduced by control valve 54 and passed through the nozzle assembly, the conditioning agent is atomized into droplets of less than 50 microns so that it is rapidly evaporated by the flue gas before reaching the precipitator 14. The evaporated conditioning agent acts to reduce the resistivity of the particulate in the flue gas thereby increasing the effectiveness of the precipitator 14 to remove the particulate from the flue gas. Baghouse operation will be improved as previously disclosed.

The first, second and third heat exchangers 34, 38, and 42 are shown connected in series so that the liquid conditioning agent is efficiently heated in steps to the point where it has absorbed sufficient heat of vaporization that it will rapidly vaporize when passed through the throttle valve 46. However, the number of heat exchangers needed to produce sufficient heat absorption is dependent upon the size of boiler system, the temperature and quantity of flue gas passing through conduit 10, and the quantity of conditioning agent per unit time needed to adequately condition the flue gas. Accordingly, the number of heat exchangers may be varied from a single unit to more than three units depending upon the parameters of the system.

Heat exchangers 34, 38 and 42 may be any type of air-to-air heat exchanger such as those produced by Foster Wheeler Energy Corporation. Nozzle assembly 58 is also a conventional nozzle system such as the Lechler supersonic, two fluid nozzle, or the linear VGA nozzle produced by VGA Inc. Similarly, atomization chamber 50 is also a conventional chamber such as those produced by Fisher Inc., and pump 24 is a conventional pump such as those produced by Ingersoll-Rand or De Laval Inc.

Control valve 54 can be controlled by appropriate control circuitry that senses the resistivity of the particulate by monitoring precipitator response and increasing the flow of conditioning agent and atomizing fluid if the resistivity increases. Similarly, pump 24 can be controlled by sensing the temperature at the output of throttle valve 46 so that the heat absorption of the conditioning agent in the heat exchangers can be increased or decreased.

Figure 2:
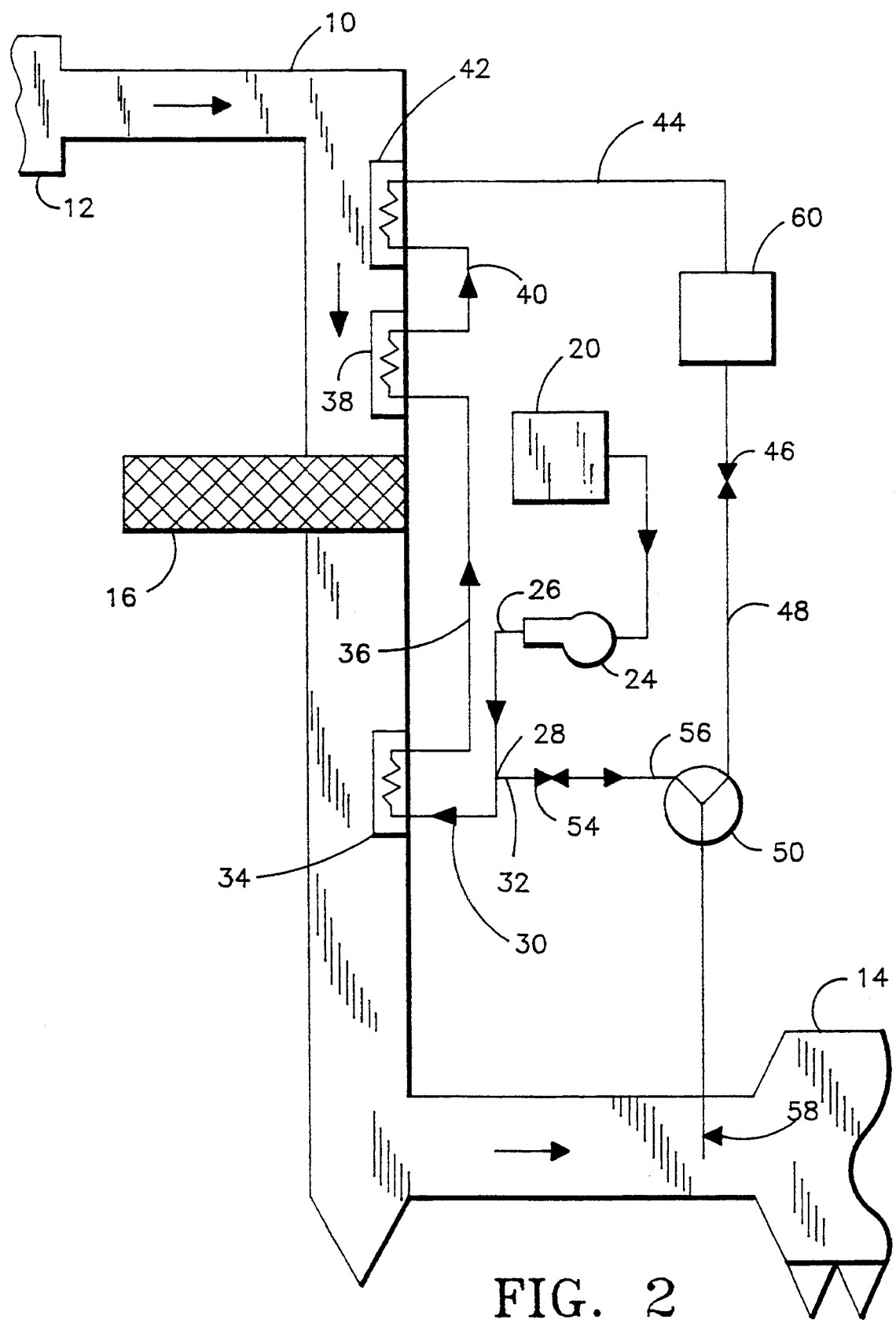
FIG. 2 is a block diagram of an alternative embodiment of the present invention.

With reference to FIG. 2, an alternative embodiment of the present invention is illustrated. The alternative embodiment illustrated is substantially the same as the first embodiment with the same reference numbers used for the same corresponding parts except that an auxiliary heating unit 60 is positioned between the output of heat exchanger 42 and throttle valve 46. Typically, such an auxiliary heat means is an electric heater or a heating unit that uses fossil fuel combustion as the source of heat.

Auxiliary heating unit 60 is used to provide additional heat to the liquid conditioning agent before it is passed through throttle valve 46 in those cases where insufficient heat is provided by the flue gas to the heat exchangers to allow for atomization of the conditioning agent into droplets of less than 50 microns. Because of the heat transferred from the flue gas by the first, second and third heat exchangers 34, 38 and 42, the amount of additional heat required by auxiliary heating unit 60 to produce highly atomized conditioning agent is minimized thereby reducing the overall cost. Thus, even if sufficient heat is not available from the flue gas, the cost to produce highly atomized conditioning agent is substantially reduced making the system more economically feasible.

Figure 3:
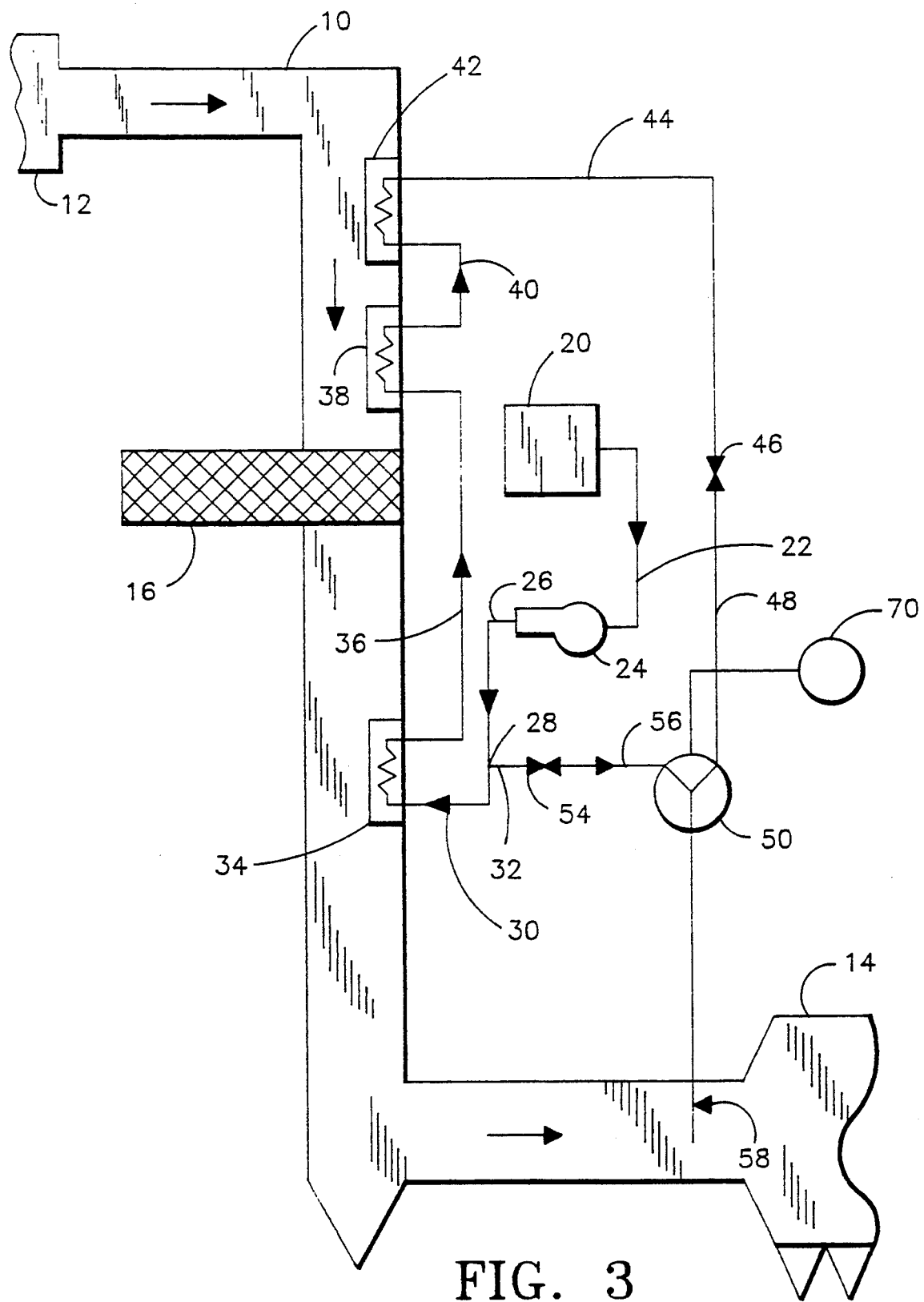
FIG. 3 is a block diagram of yet another alternative embodiment of the present invention.

With reference to FIG. 3, yet another embodiment of the present invention is illustrated. In this embodiment, as in the last embodiment, the system is substantially the same with the same reference numbers used for the same corresponding parts, except that an auxiliary air compressor 70 is connected to an inlet of the atomization chamber 50. Auxiliary air compressor 70 provides additional energy to the conditioning agent in atomization chamber 50 to increase the atomization in those instances where insufficient heat is provided by the flue gas to allow for atomization into droplets of less than 50 microns. The increase pressure provided by the auxiliary air compressor 70 causes the conditioning agent to pass through the nozzle assembly 58 with higher velocity thereby increasing the atomization. As in the previous embodiment, because of the heat transferred from the flue gas, the amount of energy necessary to operate air compressor 70 is reduced far below what would be required if no heat had been added thereby reducing the cost of operation and increasing the economic feasibility of the system.

The present invention allows for the injection of highly atomized conditioning agent such as water, proprietary chemicals, activated charcoal, or water mixtures, or ammonia or ammonium salts into the flue gas using the "waste" heat of the system that would otherwise go unused out the smoke stack to produce or enhance the atomization. The atomized water can be used to adjust the resistivity of the flue gas to increase the efficiency of an electrostatic precipitator. Additionally, the introduction of atomized water can be used to reduce the flue gas temperature which reduces the flue gas volume as well. The reduced volume of flue gas has the additional beneficial effect of reducing the required fan capacity and fan power requirement required to move the reduced gas volume.

The injection of atomized water into the flue gas also has beneficial effects in systems that utilize fabric filter baghouses to remove the particulate. The effectiveness of a fabric filter will increase with the addition of humidity to the flue gas which increases ash cohesivity and dust cake porosity. Thus, the pressure drop across the baghouse is reduced by the introduction of humidity to the flue gas thereby reducing fan power requirements.

If sufficient quantities of water are injected, the flue gas temperature may be reduced to the point where heavy metal toxic components will condense and be removed with the particulate.

These and other benefits and advantages may be achieved by the present invention as described herein and defined in the appended claims. Further, it should be apparent that various equivalent alterations, changes and modifications to the present embodiments may be made without departing from the spirit and scope of the present invention as claimed in the appended claims.

I claim:

1. In a conventional boiler system having a flue gas conduit for conveying heated flue gas from the fuel combustion chamber of the boiler to a particulate removing device, an improved system for treating boiler flue gas to improve the removal of particulate matter from the flue gas comprising:
   a. a source of liquid conditioning agent;
   b. heat exchanger means for transferring sufficient heat from the flue gas to the liquid conditioning agent to exceed the heat of vaporization of said conditioning agent, so that said conditioning agent becomes a heated conditioning agent, said heat exchanger means having an inlet and an outlet;
   c. pump means connected between said source of conditioning agent and said inlet of said heat exchanger means for conveying said conditioning agent to said heat exchanger means under sufficient pressure so as to maintain said conditioning agent in a liquid state within said heat exchanger means;
   d. throttle means connected to said outlet of said heat exchanger means for rapidly reducing the pressure of said heated conditioning agent passing through said throttle means by an amount sufficient to cause said conditioning agent to vaporize, so that said heated conditioning agent becomes a vaporized conditioning agent;
   e. atomization means for combining predetermined quantities of said liquid conditioning agent from said source of conditioning agent with a sufficient amount of said vaporized conditioning agent from said throttle means to atomize and inject the conditioning agent into the flue gas conduit before the particulate removing device in droplets small enough to evaporate without forming a sludge coating.

2. An improved system for treating boiler flue gas to improve the removal of particulate matter in a boiler system, as claimed in claim 1, wherein said conditioning agent is water.

3. An improved system for treating boiler flue gas to improve the removal of particulate matter in a boiler system, as claimed in claim 1, wherein said conditioning agent is a mixture of water and ammonia.

4. An improved system for treating boiler flue gas to improve the removal of particulate matter in a boiler system, as claimed in claim 1, wherein said conditioning agent is a mixture of water and an ammonium salt.

5. An improved system for treating boiler flue gas to improve the removal of particulate matter in a boiler system, as claimed in claim 4, wherein said ammonium salt is selected from a class comprising ammonium sulfate and ammonium bisulfate.

6. An improved system for treating boiler flue gas to improve the removal of particulate matter in a boiler system, as claimed in claim 1, wherein said heat exchanger means comprises a plurality of heat exchanger units positioned within the flue gas conduit and connected to one another in series.

7. An improved system for treating boiler flue gas to improve the removal of particulate matter in a boiler system, as claimed in claim 1, further comprising a control valve means connected between said atomization means and said pump means for conveying controllable quantities of liquid conditioning agent from said pump to said atomization means.

8. An improved system for treating boiler flue gas to improve the removal of particulate matter in a boiler system, as claimed in claim 1, further comprising an auxiliary heat means connected between the heat exchanger means and the throttle means for introducing additional heat to the conditioning agent.

9. An improved system for treating boiler flue gas to improve the removal of particulate matter in a boiler system, as claimed in claim 8, wherein said auxiliary heat means is an electric heater.

10. An improved system for treating boiler flue gas to improve the removal of particulate matter in a boiler system, as claimed in claim 8, wherein said auxiliary heat means is a heating unit that uses combustion of fossil fuels as the source of heat.

11. An improved system for treating boiler flue gas to improve the removal of particulate matter in a boiler system, as claimed in claim 1, further comprising air compressor means connected to said atomization means for increasing the pressure within said atomization means to facilitate the atomization of said conditioning agent.

12. An improved system for treating boiler flue gas to improve the removal of particulate matter in a boiler system, as claimed in claim 1, wherein said atomization means comprises a hollow atomizing chamber and an injection means communicating with the hollow atomizing chamber for introducing the atomizer conditioning agent into the flue gas conduit in a fine mist before the particulate removing device.

13. A system for treating boiler flue gas to improve the removal of particulate matter from the flue gas comprising:
   a. a fuel combustion chamber for burning fuel to heat the boiler;
   b. a particulate removing device;
   c. a flue gas conduit for conveying heated flue gas from the fuel combustion chamber of the boiler to the particulate removing device;
   d. a source of water;
   e. heat exchanger means positioned in the flue gas conduit for transferring sufficient heat from the flue gas to the water to exceed the heat of vaporization of said water so that said water becomes heated water, said heat exchanger means having an inlet and an outlet;
   f. a water pump having an inlet and an outlet, said inlet connected to said source of water and said outlet connected to said inlet of said heat exchanger means so that said water is conveyed to said heat exchanger means under sufficient pressure so as to maintain said water in a liquid state within said heat exchanger means;
   g. a throttle valve having an inlet and an outlet, said inlet of said throttle valve connected to said outlet of said heat exchanger means, said throttle valve set to rapidly reduce the pressure of said heated water passing through said throttle valve by an amount sufficient to cause said water to vaporize at said outlet of said throttle valve;
   h. a control valve having an inlet and an outlet, said inlet of said control valve connected to an outlet of said pump;
   i. a hollow atomization chamber communicating with said outlet of said throttle valve to receive vaporized water from said throttle valve, said atomization chamber also communicating with the outlet of said control valve to receive liquid water from said pump, wherein predetermined quantities of said liquid water from said pump are combined with a sufficient quantities of said vaporized water from said throttle valve to cause the water to be atomized;
   j. an injection means communicating with the hollow atomization chamber for introducing the atomized conditioning agent into the flue gas conduit in a fine mist before the particulate removing device in droplets small enough to evaporate without forming a sludge coating.

14. A system for treating boiler flue gas as claimed in claim 13, wherein said source of water comprises a source of a mixture of ammonia and water.

15. A system for treating boiler flue gas as claimed in claim 13, wherein said source of water comprises a source of a mixture of ammonium salt and water.

16. A system for treating boiler flue gas as claimed in claim 15, wherein the ammonium salt is selected from a class comprising ammonium sulfate and ammonium bisulfate.

17. A system for treating boiler flue gas as claimed in claim 13, further comprising an auxiliary heat means connected between the heat exchanger means and the throttle valve for introducing additional heat to the water.

18. A system for treating boiler flue gas as claimed in claim 17, wherein said auxiliary heat means is an electric heater.

19. A system for treating boiler flue gas as claimed in claim 17, wherein said auxiliary heat means is a heating unit that uses combustion of fossil fuels as the source of heat.

20. A system for treating boiler flue gas as claimed in claim 13, further comprising air compressor means connected to said atomization chamber, said compressor means operable to increase the pressure within said atomization means to facilitate the atomization of said water.

* * * * *

UNITED STATES PATENT AND TRADEMARK OFFICE
CERTIFICATE OF CORRECTION

PATENT NO. : 5,370,720

DATED : December 6, 1994

INVENTOR(S) : Kent S. Duncan

It is certified that error appears in the above-identified patent and that said Letters Patent is hereby corrected as shown below:

On the Title Page:

In field [73] identifying the Assignee, the name "Welhelm" should be replaced by --Wilhelm--;

in column 1, line 41, "ohm/cm" should be replaced by --ohms/cm--;

in column 2, line 50, "izer" should be replaced by --ized--;

in column 3, line 23, "atomizer" should be replaced by --atomized--;

and in column 9, line 2, "atomizer" should be replaced by --atomized--.

Signed and Sealed this

Thirteenth Day of June, 1995

*Attest:*

BRUCE LEHMAN

*Attesting Officer*  *Commissioner of Patents and Trademarks*